(12) United States Patent
Uematsu et al.

(10) Patent No.: US 11,444,657 B2
(45) Date of Patent: Sep. 13, 2022

(54) SIGNAL TRANSMISSION CIRCUIT AND SIGNAL TRANSMISSION SYSTEM

(71) Applicant: Hitachi Astemo, Ltd., Hitachinaka (JP)

(72) Inventors: Yutaka Uematsu, Tokyo (JP);
Hideyuki Sakamoto, Hitachinaka (JP);
Masahiro Toyama, Tokyo (JP);
Hidetatsu Yamamoto, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/432,288

(22) PCT Filed: Feb. 21, 2020

(86) PCT No.: PCT/JP2020/007012
§ 371 (c)(1),
(2) Date: Aug. 19, 2021

(87) PCT Pub. No.: WO2020/171202
PCT Pub. Date: Aug. 27, 2020

(65) Prior Publication Data
US 2022/0190874 A1 Jun. 16, 2022

(30) Foreign Application Priority Data
Feb. 22, 2019 (JP) .............................. JP2019-030973

(51) Int. Cl.
*H04B 3/04* (2006.01)
*H04L 25/03* (2006.01)
(52) U.S. Cl.
CPC ............... *H04B 3/04* (2013.01); *H04L 25/03* (2013.01)

(58) Field of Classification Search
CPC .................................. H04B 3/04; H04L 25/03
See application file for complete search history.

(56) References Cited

U.S. PATENT DOCUMENTS

| 4,303,895 A | 12/1981 | Ohnishi et al. |
| 9,768,991 B2 * | 9/2017 | Desclos ................... H04B 1/40 |

(Continued)

FOREIGN PATENT DOCUMENTS

| JP | S55-109023 A | 8/1980 |
| JP | 2007-143055 A | 6/2007 |

(Continued)

OTHER PUBLICATIONS

International Search Report with English translation and Written Opinion issued in corresponding application No. PCT/JP2020/007012 dated Mar. 31, 2020.

*Primary Examiner* — Jean B Corrielus
(74) *Attorney, Agent, or Firm* — Foley & Lardner LLP

(57) ABSTRACT

A signal transmission circuit that is connected to a communication unit by a signal wiring and performs signal transmission to/from the communication unit via the signal wiring includes: a direct-current supply unit that outputs a direct current with a variable output voltage, superimposes the direct current on the signal, and supplies the direct current to the communication unit via the signal wiring; a signal reception unit that receives the signal from the communication unit; and a signal processing unit that performs signal processing based on the signal received by the signal reception unit, wherein the signal reception unit has an equalizer function that adjusts a waveform of the signal to compensate for attenuation due to the signal wiring, and the output voltage is controlled based on an equalizer setting value used for control of the equalizer function.

8 Claims, 13 Drawing Sheets

(56) References Cited

U.S. PATENT DOCUMENTS

| | | | |
|---|---|---|---|
| 2006/0159186 A1* | 7/2006 | King | H04L 5/20 |
| | | | 375/258 |
| 2014/0086297 A1 | 3/2014 | Shen et al. | |
| 2015/0326775 A1* | 11/2015 | Oba | H04N 5/23203 |
| | | | 348/148 |
| 2016/0054777 A1 | 2/2016 | Dwelley et al. | |
| 2019/0058320 A1* | 2/2019 | Dragoi | G07C 5/0808 |

FOREIGN PATENT DOCUMENTS

| | | | |
|---|---|---|---|
| JP | 2009-267699 A | | 11/2009 |
| JP | 2010-039544 A | | 2/2010 |
| JP | 2010130499 A | * | 6/2010 |
| JP | 2012175644 A | * | 9/2012 |
| JP | 2016-046815 A | | 4/2016 |

* cited by examiner

SIGNAL TRANSMISSION CIRCUIT AND SIGNAL TRANSMISSION SYSTEM

TECHNICAL FIELD

The present invention relates to a signal transmission circuit and a signal transmission system for performing signal transmission between devices.

BACKGROUND ART

In recent years, in order to reduce the weight and cost of a wire harness in signal transmission between vehicle-mounted devices, a transmission method called power over coax (PoC), which achieves signal transmission and power supply by a single, lightweight and low-cost coaxial cable, has been adopted. In PoC, a signal and a power supply are separated by using a filter circuit called a PoC filter mounted on a device on each of the transmission side and the reception side, whereby the signal and the power supply can flow in a superimposed manner on one coaxial cable without adversely affecting the signal quality.

In the case of employing PoC, when devices having different PoC filter characteristics are connected to each other, the signal current leaks to the power supply side in an unintended frequency band, and thus the transmission quality sometimes deteriorates Therefore, it is necessary to make the PoC filter characteristics match between the transmission side and the reception side. However, when there are many combinations of devices to be connected, the PoC filter characteristics do not necessarily match. Hence, there is a need for a technology to prevent deterioration in transmission quality even between devices having different PoC filter characteristics.

PTL 1 is known as a background art related the present invention. PTL 1 discloses a digital data transmission apparatus in which digital data output from a system LSI is provided to an external memory via a transmission path, wherein a waveform shaping means for overshooting a waveform output from the system LSI to the transmission path and an adjusted voltage generation means for performing feedback control of the amount of overshoot by the waveform shaping means based on the output of the waveform shaping means are provided so that the influence of waveform distortion generated by the transmission path can be eliminated.

CITATION LIST

Patent Literature

PTL 1: JP 2009-267699 A

SUMMARY OF INVENTION

Technical Problem

The technology of PTL 1 enables high-speed transmission of data by improving a change in a signal waveform when a digital signal expressed by a combination of high-level and low-level voltages passes through a transmission path. Since application to PoC is not intended, it is not possible to prevent deterioration in the transmission quality between devices having different PoC filter characteristics.

Solution to Problem

A signal transmission circuit according to the present invention is a signal transmission circuit that is connected to a communication unit by a signal wiring and performs signal transmission to/from the communication unit via the signal wiring, the signal transmission circuit including: a direct-current supply unit that outputs a direct current with a variable output voltage, superimposes the direct current on the signal, and supplies the direct current to the communication unit via the signal wiring; a signal reception unit that receives the signal from the communication unit; and a signal processing unit that performs signal processing based on the signal received by the signal reception unit, wherein the signal reception unit has an equalizer function that adjusts a waveform of the signal to compensate for attenuation due to the signal wiring, and the output voltage is controlled based on an equalizer setting value used for control of the equalizer function.

A signal transmission system according to the present invention includes: a communication unit that transmits a signal; and a control unit that is connected to the communication unit by a signal wiring and receives the signal transmitted from the communication unit via the signal wiring, wherein the control unit includes: a direct-current supply unit that outputs a direct current with a variable output voltage, superimposes the direct current on the signal, and supplies the direct current to the communication unit via the signal wiring; a signal reception unit that receives the signal from the communication unit; and a signal processing unit that performs signal processing based on the signal received by the signal reception unit, wherein the signal reception unit has an equalizer function that adjusts a waveform of the signal to compensate for attenuation due to the signal wiring, and the output voltage is controlled based on an equalizer setting value used for control of the equalizer function.

Advantageous Effects of Invention

According to the present invention, it is possible to prevent deterioration in the transmission quality between devices having different PoC filter characteristics.

DESCRIPTION OF EMBODIMENTS

Figure 1:
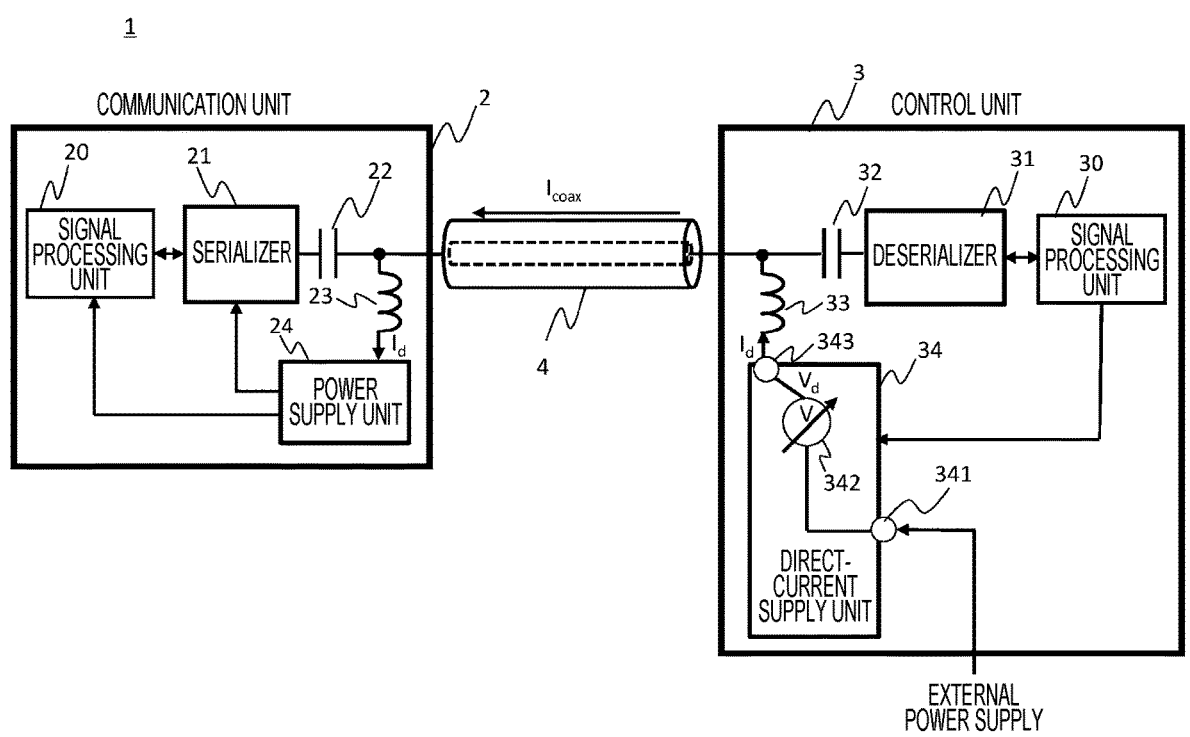
FIG. 1 is a view illustrating a signal transmission system according to a first embodiment of the present invention.

Embodiments of the present invention will be described below with reference to the drawings. The following description and drawings are illustrative of the present invention and are omitted and simplified as appropriate for a clearer description. The present invention can also be carried out in various other forms. Unless otherwise specified, each component may be singular or plural.

For the purpose of facilitating understanding of the invention, the position, size, shape, range, and the like, of each component shown in the drawings do not necessarily represent the actual position, size, shape, range, and the like. Therefore, the present invention is not necessarily limited to the position, size, shape, range, and the like, disclosed in the drawings.

When there are a plurality of components having the identical or similar functions, the identical reference numerals may be given different suffixes for explanations. However, if the plurality of components do not need to be distinguished, suffixes are sometimes omitted for explanations.

The following description sometimes includes description of processing performed by executing a program. The program is executed by a processor (e.g., CPU or GPU), and thus the determined processing is performed while appropriately using a storage resource (e.g., memory) and/or an interface device (e.g., communication port). Hence, the agent of the processing may be a processor. Similarly, the agent of processing performed by executing the program may be a controller, a device, a system, a computer, or a node having a processor. The agent of processing that executes and performs the program is only required to be an arithmetic operation unit, and may also include a dedicated circuit (e.g., FPGA or ASIC) that performs specific processing.

The program may be installed from a program source to a device such as a computer. The program source may be, for example, a program distribution server or a computer-readable storage medium. When the program source is a program distribution server, the program distribution server may include a processor and a storage resource that stores a distribution target program, and the processor of the program distribution server may distribute the distribution target program to another computer. In the description below, two or more programs may be implemented as one program, or one program may be implemented as two or more programs.

First Embodiment

FIG. 1 is a view illustrating a signal transmission system according to the first embodiment of the present invention. A signal transmission system 1 illustrated in FIG. 1 is configured so that a communication unit 2 and a control unit 3 are connected to each other via a signal wiring 4, and a signal is transmitted between the communication unit 2 and the control unit 3 via the signal wiring 4. In the present embodiment, the signal wiring 4 is configured by using, for example, a coaxial cable. The following description assumes that signal transmission is performed from the communication unit 2 to the control unit 3, but on the contrary, signal transmission may be performed from the control unit 3 to the communication unit 2, or bidirectional communication may be performed.

The communication unit 2 is a transmission source of a signal transmitted in the signal transmission system 1, and is used in combination with various pieces of equipment and devices. The communication unit 2 is mounted on a camera installed in a vehicle, for example, and transmits an image signal based on image information acquired by the camera to the control unit 3 via the signal wiring 4. The communication unit 2 includes a signal processing unit 20, a serializer 21, a capacitor 22, an inductor 23, and a power supply unit 24.

The signal processing unit 20 performs various types of signal processing in accordance with the application of the equipment or the device on which the communication unit 2 is mounted, and outputs a parallel signal based on the processing result to the serializer 21. The serializer 21 converts the parallel signal output from the signal processing unit 20 into a serial signal, and outputs it to the signal wiring 4 via the capacitor 22. Thus, a signal is transmitted from the communication unit 2 to the control unit 3 via the signal wiring 4.

The capacitor 22 is connected between the signal wiring 4 and the serializer 21, and functions as a high-pass filter that transmits a signal output from the serializer 21 and blocks a direct current Id supplied from the control unit 3 via the signal wiring 4. The inductor 23 is connected between the signal wiring 4 and the power supply unit 24, and functions as a low-pass filter (PoC filter) that transmits the direct current Id supplied from the control unit 3 via the signal wiring 4, and blocks the signal output from the serializer 21. The power supply unit 24 receives the direct current Id supplied from the control unit 3 and passed through the inductor 23, and supplies power to the signal processing unit 20 and the serializer 21 by using this direct current Id.

The control unit 3 functions as a signal transmission circuit that transmits signals to/from the communication unit 2 in the signal transmission system 1, receives signals transmitted from the communication unit 2, and performs various processing and controls. For example, when an electronic control unit (ECU) that performs image processing for autonomous drive is the control unit 3, this control unit 3 receives an image signal transmitted from the communication unit 2 mounted on the camera installed in the vehicle, and performs various types of arithmetic processing related to autonomous drive of the vehicle based on the received image signal. The control unit 3 includes a signal processing unit 30, a deserializer 31, a capacitor 32, an inductor 33, and a direct-current supply unit 34.

A serial signal transmitted from the communication unit 2 to the control unit 3 via the signal wiring 4 is input to the deserializer 31 via the capacitor 32. The deserializer 31 receives the input serial signal, converts it into a parallel signal, and outputs it to the signal processing unit 30. The deserializer 31 has a known equalizer function to compensate for attenuation of the signal by the signal wiring 4 by adjusting the waveform of the received signal in accordance with the frequency characteristic of the signal wiring 4, and can accurately detect the signal received from the communication unit 2 by using this equalizer function. The signal processing unit 30 performs various types of signal processing based on the signal received by the deserializer 31.

Using an external power supply input to an input terminal 341, the direct-current supply unit 34 generates the direct current Id with a variable output voltage Vd by an output voltage change unit 342, and outputs the generated direct current Id from an output terminal 343 to the signal wiring 4 via the inductor 33. Thus, in the signal wiring 4, the direct current Id from the control unit 3 is superimposed on the transmission signal from the communication unit 2, and a current icoax flows in the direction from the control unit 3 toward the communication unit 2. As a result, the direct current Id is supplied to the communication unit 2 via the signal wiring 4.

The output voltage Vd of the direct current Id output from the direct-current supply unit 34 is controlled by the signal processing unit 30 based on the above-described equalizer function of the deserializer 31. A specific control method of the output voltage Vd by the signal processing unit 30 will be described later.

The capacitor 32 is connected between the signal wiring 4 and the deserializer 31, and functions as a high-pass filter that transmits a signal transmitted from the communication unit 2 via the signal wiring 4 and blocks the direct current Id output from the direct-current supply unit 34. The inductor 33 is connected between the signal wiring 4 and the direct-current supply unit 34, and functions as a low-pass filter (PoC filter) that transmits the direct current Id output from the direct-current supply unit 34 and blocks the signal transmitted from the communication unit 2 via the signal wiring 4.

FIG. 1 described above illustrates the capacitor 22 and the inductor 23 each functioning as a filter in the communication unit 2, but these may be incorporated in the serializer 21 and the power supply unit 24, respectively. Similarly, the capacitor 32 and the inductor 33 each functioning as a filter in the control unit 3 may be incorporated in the deserializer 31 and the direct-current supply unit 34, respectively. A similar filter function may be achieved using a component other than a capacitor or an inductor.

Figure 2:
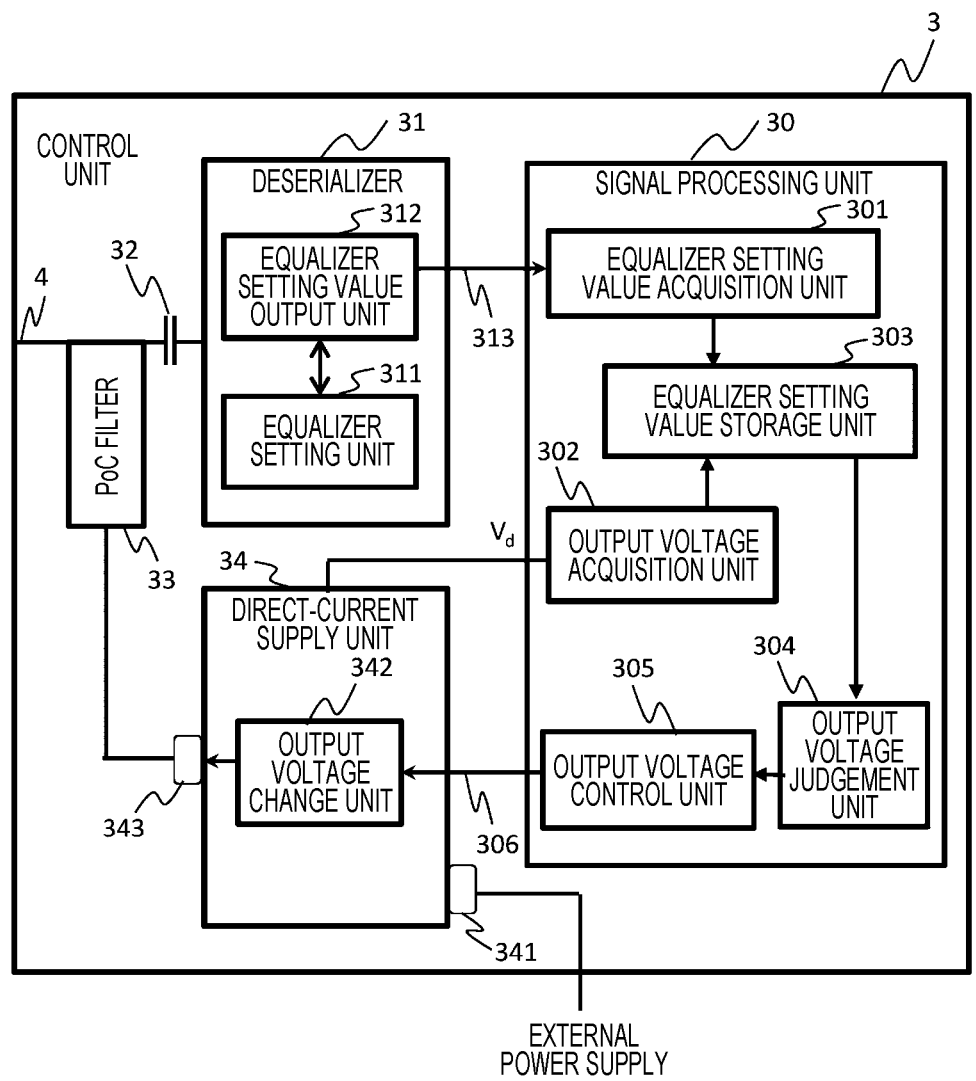
FIG. 2 is a block diagram illustrating a configuration of a control unit according to the first embodiment of the present invention.

FIG. 2 is a block diagram illustrating a configuration of the control unit 3 according to the first embodiment of the present invention. As illustrated in FIG. 2, in the control unit 3 of the present embodiment, the signal processing unit 30 includes each functional block of an equalizer setting value acquisition unit 301, an output voltage acquisition unit 302, an equalizer setting value storage unit 303, an output voltage judgement unit 304, and an output voltage control unit 305. The signal processing unit 30 can implement these functions by, for example, a program or software executed by a microcomputer, or a storage element such as a ROM or a flash memory used in combination with the microcomputer. The deserializer 31 has each functional block of an equalizer setting unit 311 and an equalizer setting value output unit 312. The deserializer 31 can implement these functions and the above-described equalizer function by an integrated circuit such as an LSI, an FPGA, and an ASIC. FIG. 2 only illustrates functional blocks related to the control of the output voltage Vd, and does not illustrate other functions that the signal processing unit 30 and the deserializer 31 have.

As described with reference to FIG. 1, the direct-current supply unit 34 has the input terminal 341 to which an external power supply is input, the output voltage change unit 342 that generates the direct current Id with a variable output voltage Vd, and the output terminal 343 that outputs the direct current Id.

The equalizer setting unit 311 decides an equalizer setting value in the equalizer function of the deserializer and operates the equalizer function. The equalizer setting unit 311 operates the equalizer function by, for example, analyzing the frequency characteristic of the signal wiring 4, and deciding, as an equalizer setting value, an amplification amount for compensating the attenuation amount for each frequency in the received signal. The equalizer setting value output unit 312 reads the equalizer setting value decided by the equalizer setting unit 311 and outputs an equalizer setting value signal 313 to the signal processing unit 30.

The equalizer setting value acquisition unit 301 receives the equalizer setting value signal 313 output from the equalizer setting value output unit 312 and acquires an equalizer setting value. The output voltage acquisition unit 302 detects and acquires the output voltage Vd of the direct current Id output from the direct-current supply unit 34. The equalizer setting value storage unit 303 stores the equalizer setting value acquired by the equalizer setting value acquisition unit 301 and the value of the output voltage Vd acquired by the output voltage acquisition unit 302 in association with each other. Here, in the direct-current supply unit 34, when deciding the optimum output voltage Vd, the output voltage change unit 342 changes the output voltage Vd in increments of a predetermined voltage value $\Delta V$ as described later. The equalizer setting value storage unit 303 stores the value of the output voltage Vd in increments of $\Delta V$ and the equalizer setting value in association with each other.

The output voltage judgement unit 304 reads the value of the output voltage Vd stored in the equalizer setting value storage unit 303 in increments of LV and the equalizer setting value, and decides an optimum value of the output voltage Vd based on these relationships. Based on the optimum value of the output voltage Vd decided by the output voltage judgement unit 304, the output voltage control unit 305 outputs an output voltage control signal 306 for controlling the output voltage Vd to the output voltage change unit 342 of the direct-current supply unit 34.

Upon receiving the output voltage control signal 306 output from the output voltage control unit 305, the output voltage change unit 342 changes the output voltage Vd in accordance with the voltage value indicated by the received output voltage control signal 306. Thus, the direct current Id output with the optimum output voltage Vd from the direct-current supply unit 34 is supplied to the communication unit 2 via the signal wiring 4.

Next, processing contents at the time of deciding the optimum value of the output voltage Vd in the present embodiment will be described. The signal transmission system 1 of the present embodiment decides the optimum value of the output voltage Vd in the initial setting at startup, for example, and starts the operation with the value of the output voltage Vd. This allows the direct current Id to be supplied from the control unit 3 to the communication unit 2 with the appropriate output voltage Vd and deterioration in the transmission quality to be prevented even when the filter characteristics of the communication unit 2 and the control unit 3 do not match. Also after the operation of the signal transmission system 1 is started, the optimum value of the output voltage Vd is decided at each predetermined timing during the operation, and the output voltage Vd is updated in accordance with the value. This allows the direct current Id to be supplied from the control unit 3 to the communication unit 2 with the appropriate output voltage Vd and deterioration in the transmission quality to be prevented even when the filter characteristic changes due to environmental change during the operation or the like.

Figure 3:
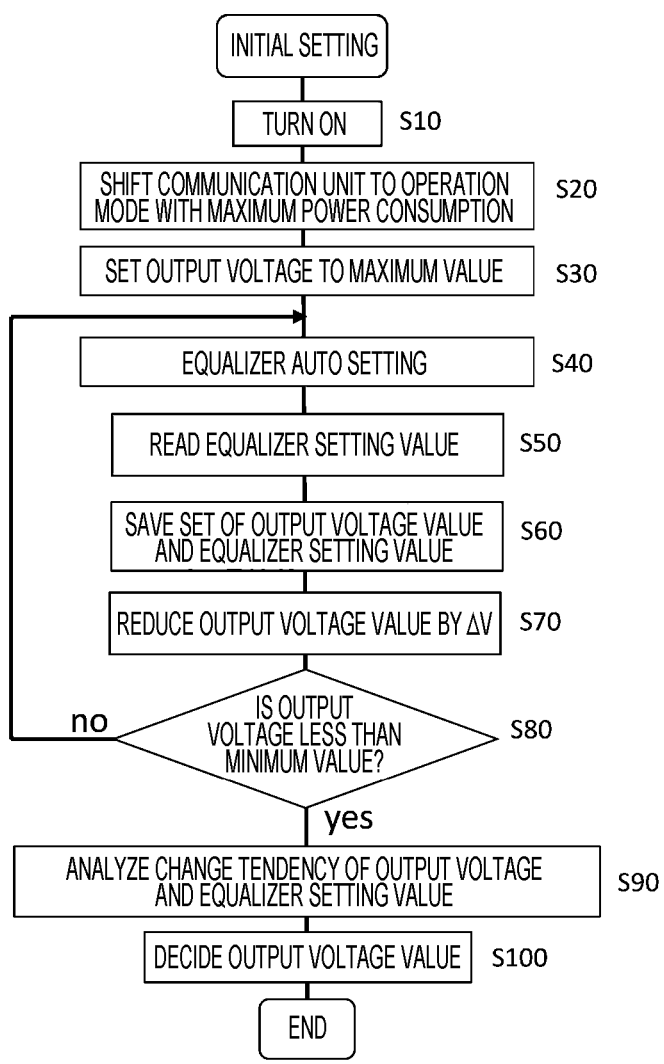
FIG. 3 is a flowchart illustrating a flow of initial setting processing according to the first embodiment of the present invention.

FIG. 3 is a flowchart illustrating a flow of initial setting processing according to the first embodiment of the present invention, which is carried out in order to perform initial setting of the value of the output voltage Vd at system startup.

In step S10, the communication unit 2 and the control unit 3 are turned on.

In step S20, the communication unit 2 shifts to the operation mode having the maximum power consumption. This operation mode is set in advance in the communication unit 2 as an operation mode for initial setting, for example.

In step S30, in the control unit 3, the output voltage change unit 342 of the direct-current supply unit 34 sets the output voltage Vd to the maximum value. The maximum value of the output voltage Vd is determined in advance in accordance with, for example, a voltage range that the power supply unit 24 of the communication unit 2 can input.

In step S40, the control unit 3 performs automatic setting of the equalizer. Here, the equalizer setting unit 311 of the deserializer 31 decides an equalizer setting value in accordance with the frequency characteristic of the signal wiring 4 in accordance with the output voltage Vd at present.

In step S50, the equalizer setting value acquisition unit 301 reads the equalizer setting value set in step S40 from the deserializer 31. Here, the equalizer setting value acquisition unit 301 acquires an equalizer setting value at present by receiving the equalizer setting value signal 313 output from the equalizer setting value output unit 312 of the deserializer 31.

In step S60, the equalizer setting value storage unit 303 stores and saves the combination of the value of the output voltage Vd at present and the equalizer setting value read in step S50.

In step S70, the value of the output voltage Vd is reduced by the predetermined voltage ΔV. Here, the output voltage control signal 306 indicating the voltage value reduced by ΔV from the current value of the output voltage Vd is output from the output voltage control unit 305, whereby the output voltage change unit 342 of the direct-current supply unit 34 is caused to change the output voltage Vd.

In step S80, it is determined whether or not the output voltage Vd changed in step S70 is less than the minimum value. The minimum value of the output voltage Vd is determined in advance in accordance with, for example, a voltage range that the power supply unit 24 of the communication unit 2 can input, similarly to the maximum value set in step S30. If it is determined in step S80 that the output voltage Vd is not less than the minimum value, the processing returns to step S40, and the processing in steps S40 to S70 is repeated. Thus, the relationship between the value of the output voltage Vd and the equalizer setting value when the output voltage Vd is changed from the maximum value to the minimum value in increments of ΔV is stored in the equalizer setting value storage unit 303. On the other hand, when the output voltage Vd reaches the minimum value, the output of the direct current Id from the direct-current supply unit 34 is stopped, and the processing proceeds to step S90.

In step S90, the output voltage judgement unit 304 analyzes the change tendency of the output voltage Vd and the equalizer setting value from the relationship between the output voltage Vd and the equalizer setting value stored and saved so far in the equalizer setting value storage unit 303 in step S60. Here, the change tendency analyzed by, for example, creating a graph indicating the relationship between the output voltage Vd and the equalizer setting value, and specifying an inflection point in the graph.

In step S100, the output voltage judgement unit 304 decides the optimum output voltage Vd based on the change tendency analyzed in step S90. After the optimum output voltage Vd is decided, the output voltage control signal 306 indicating the voltage value is output from the output voltage control unit 305, thereby controlling, to the decided output voltage Vd, the voltage of the direct current Id output from the output voltage change unit 342 of the direct-current supply unit 34.

After the processing of step S100 is executed, the flowchart of FIG. 3 is ended, and the initial setting of the output voltage Vd is completed.

Figure 4:
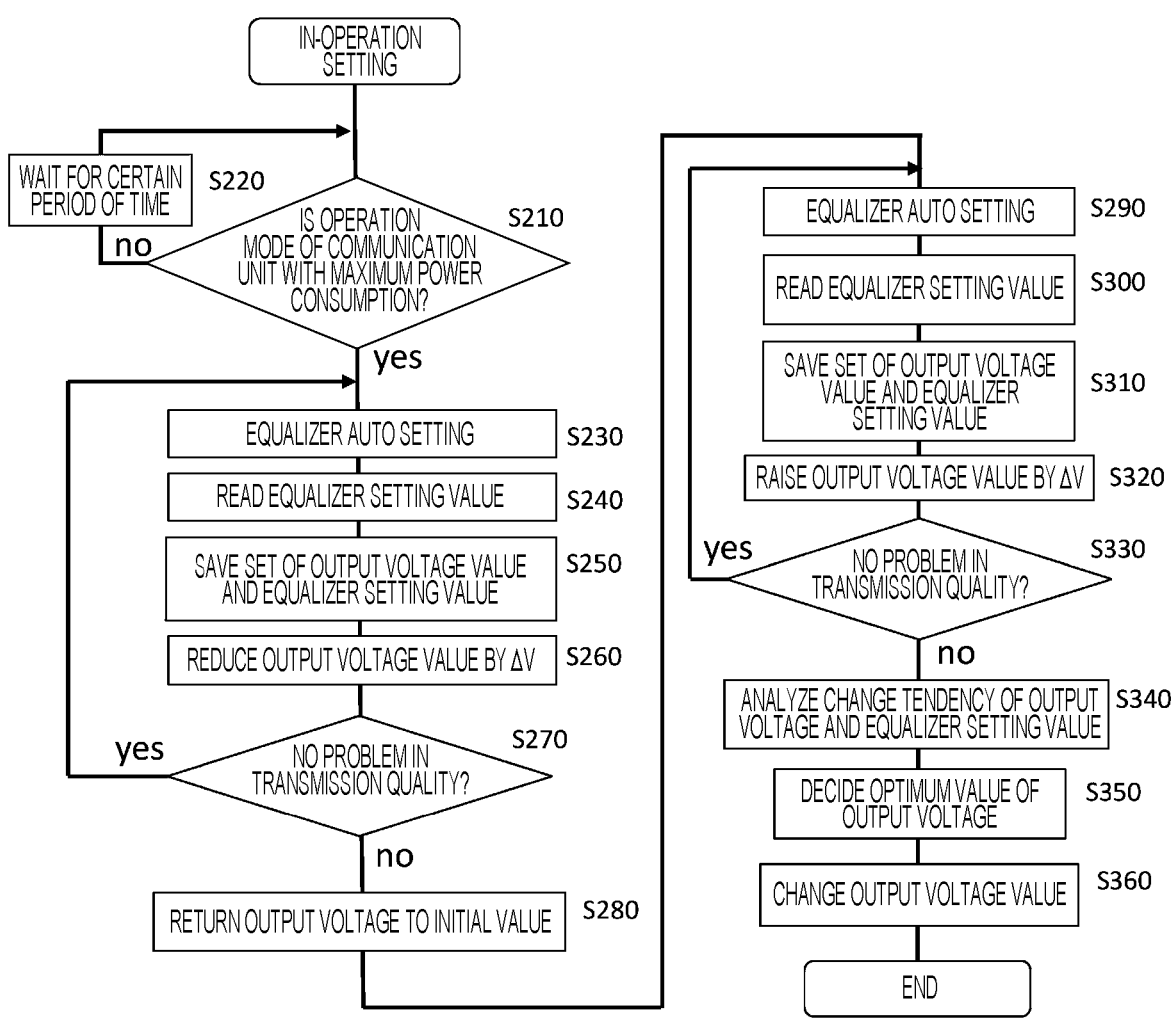
FIG. 4 is a flowchart illustrating a flow of in-operation setting processing according to the first embodiment of the present invention.

FIG. 4 is a flowchart illustrating a flow of in-operation setting processing according to the first embodiment of the present invention, which is carried out in order to reset the value of the output voltage Vd when the system is in operation.

In step S210, it is determined whether or not the operation mode of the communication unit 2 at present is an operation mode set in advance as an operation mode having the maximum power consumption. If the operation mode is not the operation mode having the maximum power consumption, the processing proceeds to step S220, and after waiting for a certain period of time, the determination of step S210 is repeated. On the other hand, if it is the operation mode having the maximum power consumption, the processing proceeds to step S230.

In steps S230 to S260, the same processing as in steps S40 to S70 in FIG. 3 is performed respectively. That is, the automatic setting of the equalizer is performed in step S230, the equalizer setting value is read from the deserializer 31 by the equalizer setting value acquisition unit 301 in step S240, the combination of the output voltage Vd and the equalizer setting value is stored in the equalizer setting value storage unit 303 in step S250, and the output voltage Vd is reduced by ΔV in step S260.

In step S270, it is determined whether or not there is a problem in the transmission quality of the signal with the output voltage Vd at present. Here, for example, the transmission quality of the signal is determined by, for example, measuring the waveform of the signal received by the deserializer 31, or by measuring the error rate of the signal received by the deserializer 31 when known information is transmitted from the communication unit 2. As a result, if it is determined that there is no problem in the transmission quality, the processing returns to step S230, and the processing of steps 3230 to 3260 is repeated. On the other hand, if it is determined that there is a problem in the transmission quality, the processing proceeds to step S280.

In step S280, the output voltage Vd is returned to the initial value, i.e., the voltage value before the in-operation setting processing of FIG. 4 is started.

In steps S290 to S320, the same processing as in steps S230 to S260 is performed respectively. However, in step S320, the output voltage Vd is raised by ΔV instead of being reduced by ΔV. That is, the automatic setting of the equalizer is performed in step S290, the equalizer setting value is read from the deserializer 31 by the equalizer setting value acquisition unit 301 in step S300, the combination of the output voltage Vd and the equalizer setting value is stored in an equalizer setting value storage unit 303 in step S310, and the output voltage Vd raised by ΔV in step S2320.

In step S330, similarly to step S270 described above, it is determined whether or not there is a problem in the transmission quality of the signal with the output voltage Vd at present. As a result, if it is determined that there is no problem in the transmission quality, the processing returns to step S290, and the processing of steps S290 to S320 is repeated. On the other hand, if it is determined that there is a problem in the transmission quality, the processing proceeds to step S340.

In the in-operation setting processing of FIG. 4, the relationship between the value of the output voltage Vd and the equalizer setting value when the output voltage Vd is changed in increments of ΔV before and after the initial value is stored in the equalizer setting value storage unit 303 by the processing of steps S230 to S330.

In step S340, the output voltage judgement unit 304 analyzes the change tendency of the output voltage Vd and the equalizer setting value, as in step S90 of FIG. 3, from the relationship between the output voltage Vd and the equalizer setting value stored and saved in the equalizer setting value storage unit 303 so far in steps S250 and S310.

In step S350, the output voltage judgement unit 304 decides the optimum output voltage Vd based on the change tendency analyzed in step S340. After the optimum output voltage Vd is decided, in step S360, by outputting the output voltage control signal 306 indicating the voltage value from the output voltage control unit 305, the voltage of the direct current Id to be output in the future from the output voltage change unit 342 of the direct-current supply unit 34 is changed to the decided output voltage Vd. If the output voltage Vd decided in step S350 is the same as the initial value, the processing in step S360 is omitted.

When the processing of step S360 is executed or omitted, the flowchart of FIG. 4 is ended, the resetting of the output voltage Vd is completed, and the system operation is continued.

Figure 5:
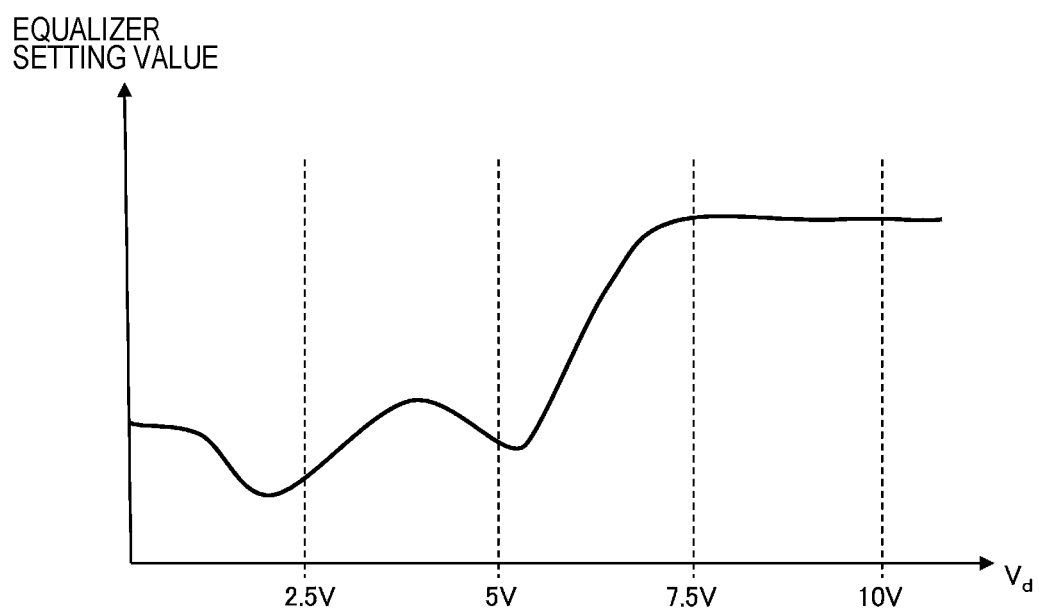
FIG. 5 is an example of a graph illustrating a relationship between an output voltage V and an equalizer setting value.

The method of deciding the optimum output voltage Vd in step S100 of FIG. 3 and step S350 of FIG. 4 will be described below with reference to FIG. FIG. 5 is an example of a graph illustrating the relationship between the output voltage Vd and the equalizer setting value stored in the equalizer setting value storage unit 303. In the graph of FIG. 5, the horizontal axis indicates the value of the output voltage Vd, and the vertical axis indicates the equalizer setting value.

Assume that in step S90 of FIG. 3 and step S340 of FIG. 4, the graph as illustrated in FIG. 5 is obtained as an analysis result of the change tendency of the output voltage Vd and the equalizer setting value. In this case, the output voltage judgement unit 304 decides, as an optimum value of the output voltage Vd, for example, 7.5 V, as a point at which the equalizer setting value starts to change when the output voltage Vd is changed from the high voltage side to the low voltage side.

Note that the decision method of the output voltage Vd described above is an example, and the optimum output voltage Vd may be decided by another decision method.

According to the first embodiment of the present invention described above, the following operations and effects are achieved.

(1) The control unit 3, functioning as a signal transmission circuit that transmits signals to/from the communication unit 2 via the signal wiring 4, is connected to the communication unit 2 via the signal wiring 4. The control unit 3 includes the direct-current supply unit 34 that outputs the direct current Id with the variable output voltage Vd, superimposes the direct current Id on a signal, and supplies the direct current Id to the communication unit 2 via signal wiring 4, a signal reception unit (deserializer 31) that receives a signal from the communication unit 2, and the signal processing unit 30 that performs signal processing based on the signal received by the deserializer 31. The deserializer 31 has an equalizer function that adjusts a waveform of the signal to compensate for attenuation due to the signal wiring 4. The output voltage Vd is controlled based on an equalizer setting value used for control of the equalizer function. With this configuration, it is possible to prevent deterioration in the transmission quality between devices having different PoC filter characteristics.

(2) The control unit 3 includes a first filter unit (capacitor 32) that is connected between the signal wiring 4 and the deserializer 31, transmits a signal, and blocks the direct current Id, and a second filter unit (inductor 33) that is connected between the signal wiring 4 and the direct-current supply unit 34, transmits the direct current Id, and blocks a signal. With this configuration, it is possible to appropriately separate the signal and the direct current Id that are superimposed on each other and transmitted through the signal wiring 4 from each other.

(3) The control unit 3 includes the equalizer setting value storage unit 303 that stores the relationship between the value of the output voltage Vd and the equalizer setting value when the output voltage Vd is changed, the output voltage judgement unit 304 that decides the output voltage Vd based on the relationship between the value of the output voltage Vd and the equalizer setting value stored in the equalizer setting value storage unit 303, and the output voltage control unit 305 that controls the output voltage Vd based on the output voltage Vd decided by the output voltage judgement unit 304. With this configuration, it is possible to control the output voltage Vd to an optimum value from the equalizer setting value.

Second Embodiment

Next, a signal transmission system according to the second embodiment of the present invention will be described. The signal transmission system of the present embodiment has the same configuration as that of the signal transmission system 1 of FIG. 1 except that the functional configuration of the signal processing unit 30 of the control unit 3 is different from that of the first embodiment. Therefore, in the following description, parts corresponding to the control unit 3 and the signal processing unit 30 will be described as a control unit 3A and a signal processing unit 30A, respectively, and description of other parts will be omitted.

Figure 6:
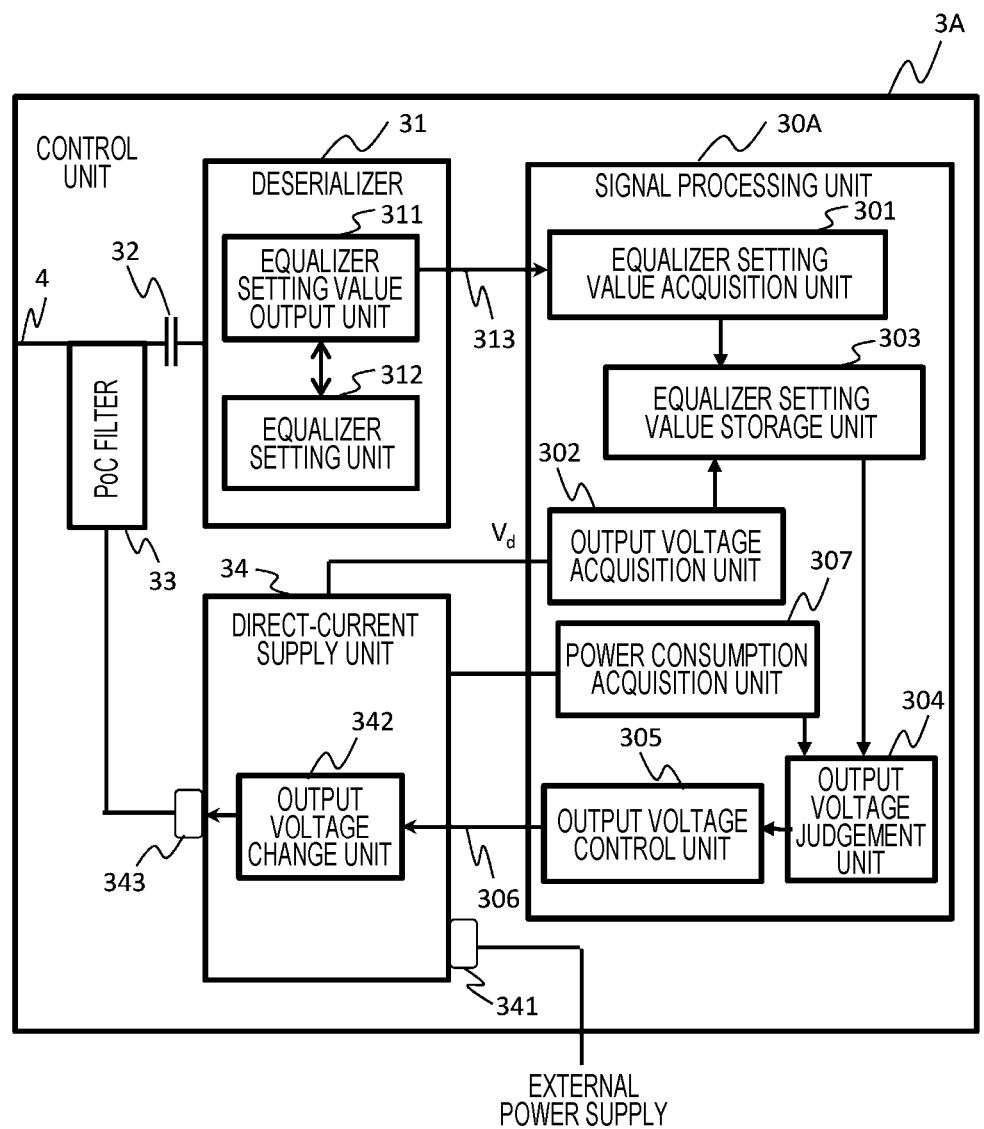
FIG. 6 is a block diagram illustrating a configuration of a control unit according to a second embodiment of the present invention.

FIG. 6 is a block diagram illustrating a configuration of the control unit 3A according to the second embodiment of the present invention. As illustrated in FIG. 6, the control unit 3A of the present embodiment has the same configuration as that of the control unit 3 of the first embodiment described with reference to FIG. 2, except that the signal processing unit 30A further includes a power consumption acquisition unit 307.

The power consumption acquisition unit 307 detects and acquires power consumption of the direct-current supply unit 34. The value of power consumption of the direct-current supply unit 34 acquired by the power consumption acquisition unit 307 is output to the output voltage judgement unit 304. The output voltage judgement unit 304 decides the optimum value of the output voltage Vd based on the relationship among the value of power consumption of the direct-current supply unit 34 that is output from the power consumption acquisition unit 307 and the value of output voltage Vd and the equalizer setting value that are stored in the equalizer setting value storage unit 303.

Figure 7:
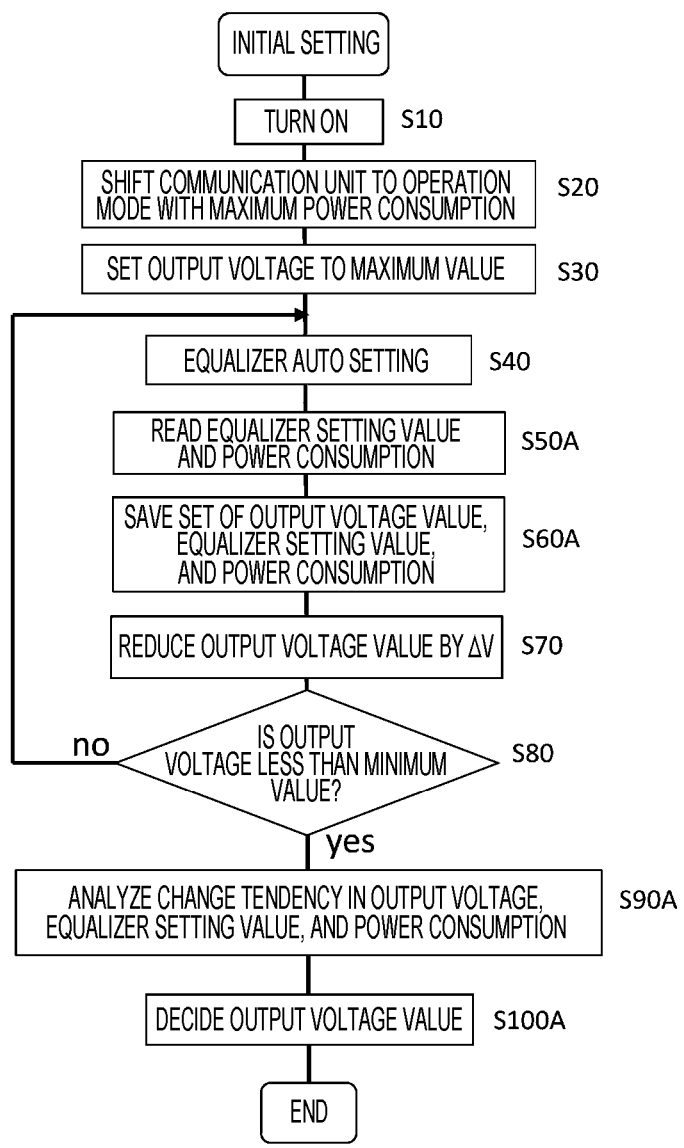
FIG. 7 is a flowchart illustrating a flow of initial setting processing according to the second embodiment of the present invention.

FIG. 7 is a flowchart illustrating a flow of initial setting processing according to the second embodiment of the present invention, which is carried out in order to perform initial setting of the value of the output voltage Vd at system startup.

In steps S10 to S40, the same processing as in FIG. 3 is performed respectively.

In step S50A, the equalizer setting value acquisition unit 301 reads the equalizer setting value set in step S40 from the deserializer 31, and the power consumption acquisition unit 307 acquires the power consumption of the direct-current supply unit 34. Here, similarly to the first embodiment, the equalizer setting value acquisition unit 301 acquires an equalizer setting value at present by receiving the equalizer setting value signal 313 output from the equalizer setting value output unit 312 of the deserializer 31. In addition, the power consumption acquisition unit 307 detects the power consumption of the direct-current supply unit 34. For example, by detecting the current value of the direct current Id output from the direct-current supply unit 34 and multiplying this current value by the output voltage Vd acquired by the output voltage acquisition unit 302, it is possible to detect the power consumption of the direct-current supply unit 34.

Automatic setting is described in step S40. However, if there is an appropriately setting means even if it is not automatic, setting may be performed using that means. This is also true for the steps of flowcharts in other embodiments.

In step S60A, the equalizer setting value storage unit 303 stores and saves the combination of the value of the output voltage Vd at present and the equalizer setting value and the power consumption acquired in step S50A.

In steps S70 to S80, the same processing as in FIG. 3 is performed respectively.

In step S90A, the output voltage judgement unit 304 analyzes the change tendency of the output voltage Vd, the equalizer setting value and the power consumption of the direct-current supply unit 34 from the relationship among the output voltage Vd, the equalizer setting value, and the power consumption of the direct-current supply unit 34 stored and saved so far in the equalizer setting value storage unit 303 in step S60A. Here, the change tendency is analyzed by, for example, creating a graph as illustrated in FIG. 5 described in the first embodiment, and superimposing and drawing, on the graph, a graph indicating the relationship between the output voltage Vd and the power consumption.

In step S100A, the output voltage judgement unit 304 decides the optimum output voltage Vd based on the change tendency analyzed in step S90A. Here, for example, a value having the lowest power consumption is selected among the values of the output voltage Vd with the equalizer setting value within a predetermined range, and the value is decided as the optimum value of the output voltage Vd. Thus, it is possible to decide the optimum value of the output voltage Vd from the tradeoff relationship between the signal quality and the power consumption. After the optimum output voltage Vd is decided, similarly to the first embodiment, the output voltage control signal 306 indicating the voltage value is output from the output voltage control unit 305, thereby controlling, to the decided output voltage Vd, the voltage of the direct current Id output from the output voltage change unit 342 of the direct-current supply unit 34.

After the processing of step S100A is executed, the flowchart of FIG. 7 is ended, and the initial setting of the output voltage Vd is completed.

Figure 8:
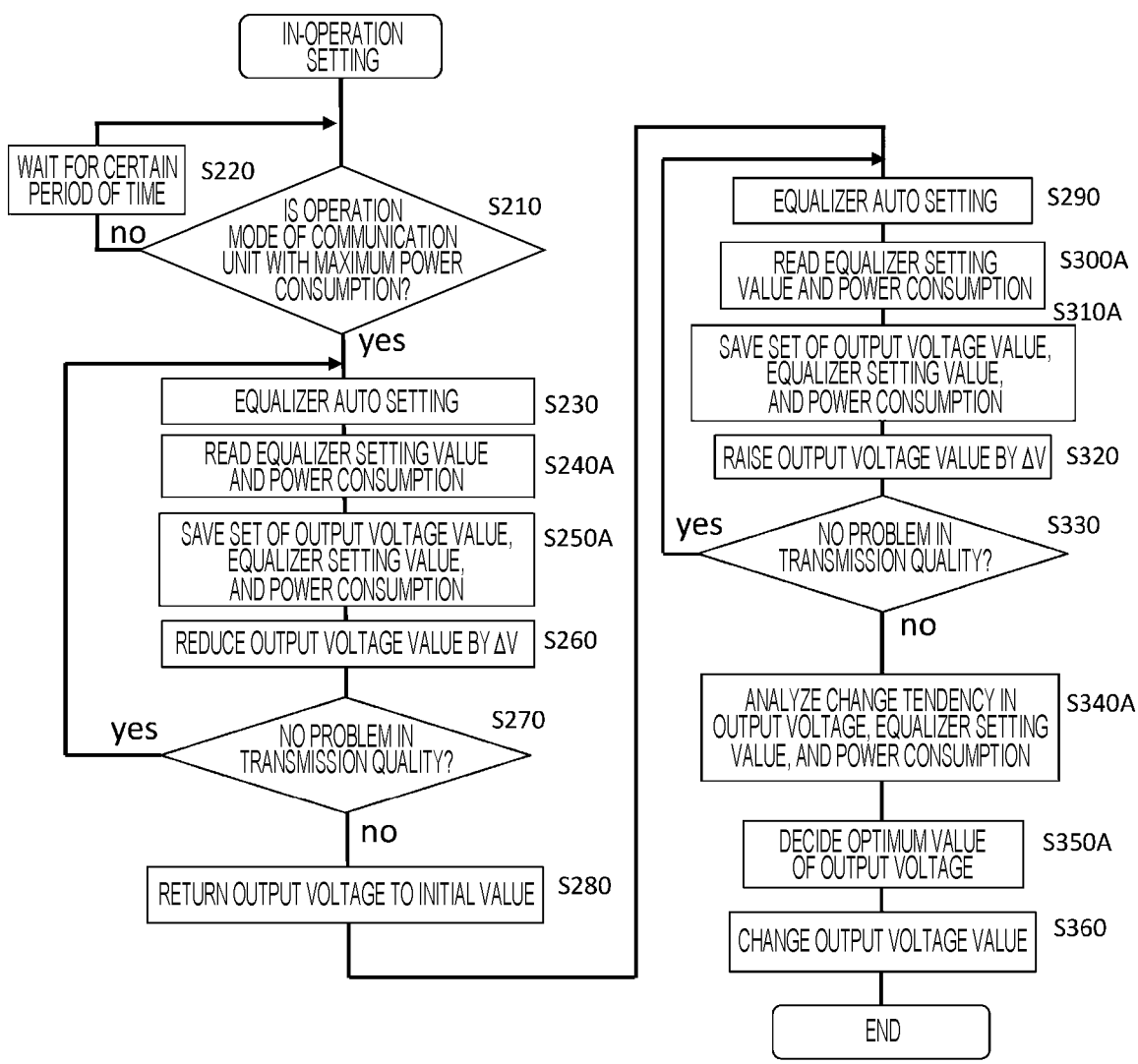
FIG. 8 is a flowchart illustrating a flow of in-operation setting processing according to the second embodiment of the present invention.

FIG. 8 is a flowchart illustrating a flow of in-operation setting processing according to the second embodiment of the present invention, which is carried out in order to reset the value of the output voltage Vd when the system is in operation.

In steps S210 to S230, the same processing as in FIG. 4 is performed respectively.

In steps S240A and S250A, the same processing as in steps S50A and S60A in FIG. 7 is performed respectively. That is, in step S240A, the equalizer setting value is read from the deserializer 31 by the equalizer setting value acquisition unit 301, and the power consumption acquisition unit 307 acquires the power consumption of the direct-current supply unit 34. In step S250A, the equalizer setting value storage unit 303 stores the combination of the output voltage Vd, the equalizer setting value, and the power consumption.

In steps S260 to S290, the same processing as in FIG. 4 is performed respectively. In steps S300A and S310A, the same processing as in steps S240A and S250A described above is performed respectively, and in steps S320 to S330, the same processing as in FIG. 4 is performed respectively.

In step S340A, the output voltage judgement unit 304 analyzes the change tendency of the output voltage Vd, the equalizer setting value and the power consumption from the relationship among the output voltage Vd, the equalizer setting value, and the power consumption stored and saved so far in the equalizer setting value storage unit 303 in step S250A and S310A, similarly to step S90A of FIG. 7.

In step S350A, by using the same method as that in step S100A of FIG. 7, the output voltage judgement unit 304 decides the optimum output voltage Vd based on the change tendency analyzed in step S340A. After the optimum output voltage Vd is decided, in step S360, as in FIG. 4, by outputting the output voltage control signal 306 indicating the voltage value from the output voltage control unit 305, the voltage of the direct current Id to be output in the future from the output voltage change unit 342 of the direct-current supply unit 34 is changed to the decided output voltage Vd.

When the processing of step S360 is executed or omitted, the flowchart of FIG. 8 is ended, the resetting of the output voltage Vd is completed, and the system operation is continued.

According to the second embodiment of the present invention described above, the control unit 3A includes the power consumption acquisition unit 307 that acquires the power consumption of the direct-current supply unit 34. The output voltage judgement unit 304 decides the output voltage Vd based on the relationship among the power consumption that is acquired by the power consumption acquisition unit 307 and the value of the output voltage Vd and the equalizer setting value that are stored in the equalizer setting value storage unit 303. With this configuration, it is possible to control the output voltage Vd to an optimum value in consideration of the tradeoff relationship between the signal quality and the power consumption.

Third Embodiment

Next, a signal transmission system according to the third embodiment of the present invention will be described. The signal transmission system of the present embodiment has the same configuration as that of the signal transmission system 1 of FIG. 1 except that the functional configuration of the signal processing unit 30 and the deserializer 31 of the control unit 3 is different from that of the first embodiment. Therefore, in the following description, parts corresponding to the control unit 3, the signal processing unit 30, and the deserializer 31 will be described as a control unit 3B, a signal processing unit 30B, and a deserializer 31B, respectively, and description of other parts will be omitted.

Figure 9:
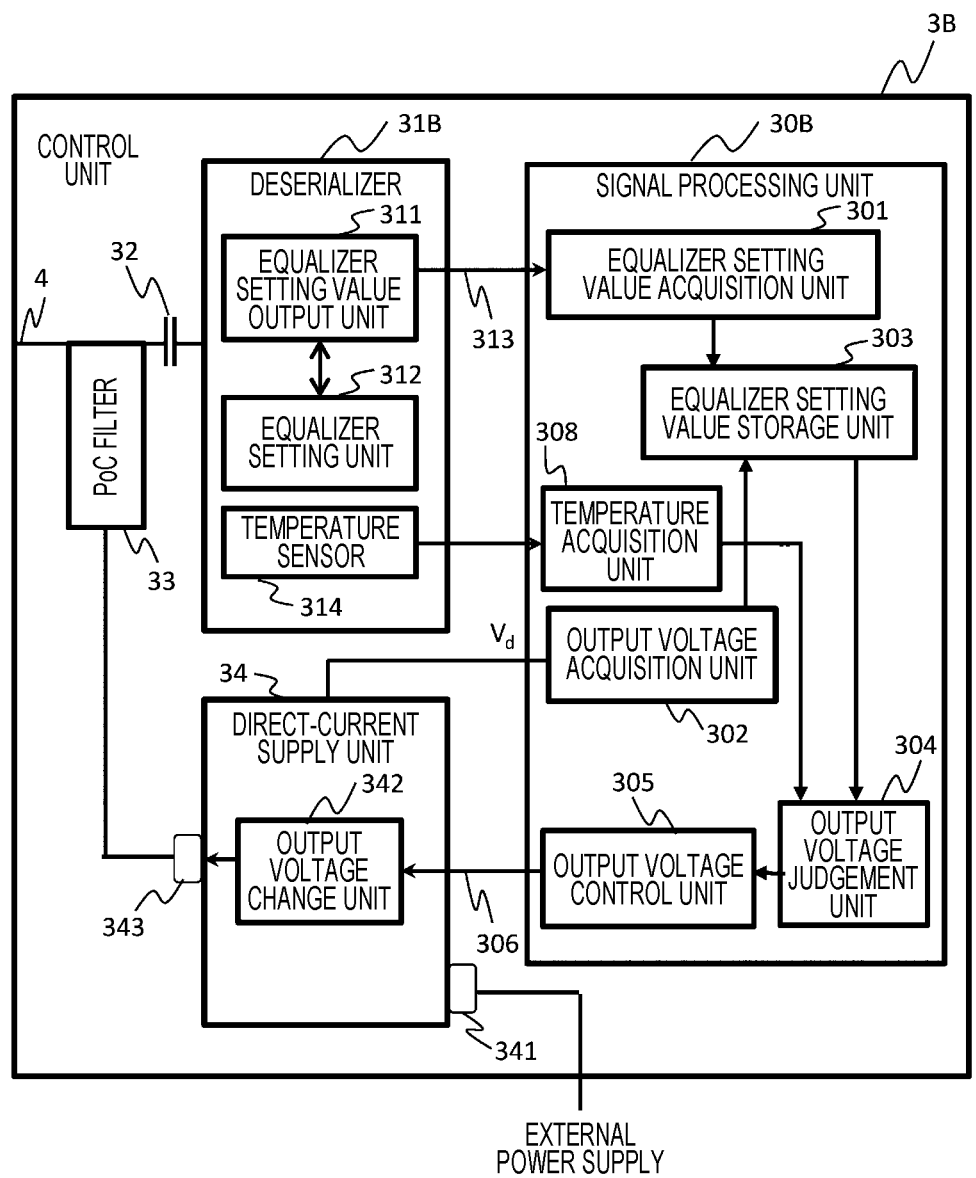
FIG. 9 is a block diagram illustrating a configuration of a control unit according to a third embodiment of the present invention.

FIG. 9 is a block diagram illustrating a configuration of the control unit 3B according to the third embodiment of the present invention. As illustrated in FIG. 9, the control unit 3B of the present embodiment has the same configuration as that of the control unit 3 of the first embodiment described with reference to FIG. 2, except that the signal processing unit 30B further includes a temperature acquisition unit 308 and the deserializer 31B further includes a temperature sensor 314.

The temperature sensor 314 detects the temperature of the deserializer 31B. The temperature acquisition unit 308 acquires the temperature of the deserializer 31B detected by the temperature sensor 314. The temperature of the deserializer 31B acquired by the temperature acquisition unit 308 is output to the output voltage judgement unit 304. The output voltage judgement unit 304 decides the optimum value of the output voltage Vd based on the relationship among the temperature of the deserializer 31B that is output from the temperature acquisition unit 308 and the value of the output voltage Vd and the equalizer setting value that are stored in the equalizer setting value storage unit 303.

Figure 10:
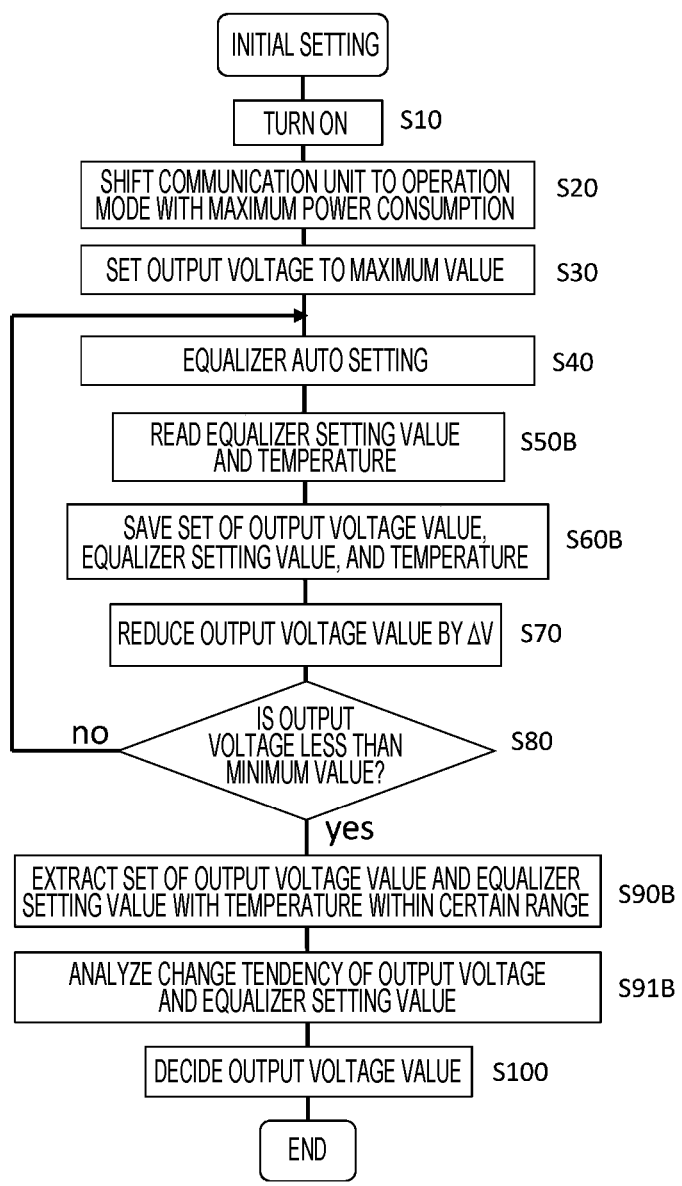
FIG. 10 is a flowchart illustrating a flow of initial setting processing according to the third embodiment of the present invention.

FIG. 10 is a flowchart illustrating a flow of initial setting processing according to the third embodiment of the present invention, which is carried out in order to perform initial setting of the value of the output voltage Vd at system startup.

In steps S10 to S40, the same processing as in FIG. 3 is performed respectively.

In step S50B, the equalizer setting value acquisition unit 301 reads the equalizer setting value set in step S40 from the deserializer 31B, and the temperature acquisition unit 308 acquires the temperature of the deserializer 31B. Here, similarly to the first embodiment, the equalizer setting value acquisition unit 301 acquires an equalizer setting value at present by receiving the equalizer setting value signal 313 output from the equalizer setting value output unit 312 of the deserializer 31B. The temperature acquisition unit 308 acquires the temperature of the deserializer 31B by receiving a sensor signal output from the temperature sensor 314.

In step S60B, the equalizer setting value storage unit 303 stores and saves the combination of the value of the output voltage Vd at present and the equalizer setting value and the temperature acquired in step S50B.

In steps S70 to S80, the same processing as in FIG. 3 is performed respectively.

In step S90B, the output voltage judgement unit 304 extracts a combination with the temperature being within a predetermined range from among the combinations of the output voltage Vd and the equalizer setting value that are stored and saved in the equalizer setting value storage unit 303 so far in step S60B. For example, a mean value of all temperature data stored in the equalizer setting value storage unit 303 is calculated, and a combination of the output voltage Vd and the equalizer setting value acquired together with temperature data having a difference with the mean value within a certain range is extracted.

Alternatively, the temperature range to be extracted in step S90B may be determined on the basis of a preset operation temperature of the deserializer 31B in a normal operation state. By a discretionary method other than that, it is possible to determine the temperature range in which a combination of the output voltage Vd and the equalizer setting value is extracted.

In step S91B, by the method described in the first embodiment, the output voltage judgement unit 304 analyzes the change tendency of the output voltage Vd and the equalizer setting value from the relationship between the output voltage Vd and the equalizer setting value extracted in step S90A.

In step S100, as in FIG. 3, the output voltage judgement unit 304 decides the optimum output voltage Vd based on the change tendency analyzed in step S91B. Then, the output voltage control signal 306 is output from the output voltage control unit 305, and the voltage of the direct current Id output from the output voltage change unit 342 of the direct-current supply unit 34 is controlled to the decided output voltage Vd.

After the processing of step S100 is executed, the flowchart of FIG. 10 is ended, and the initial setting of the output voltage Vd is completed.

Figure 11:
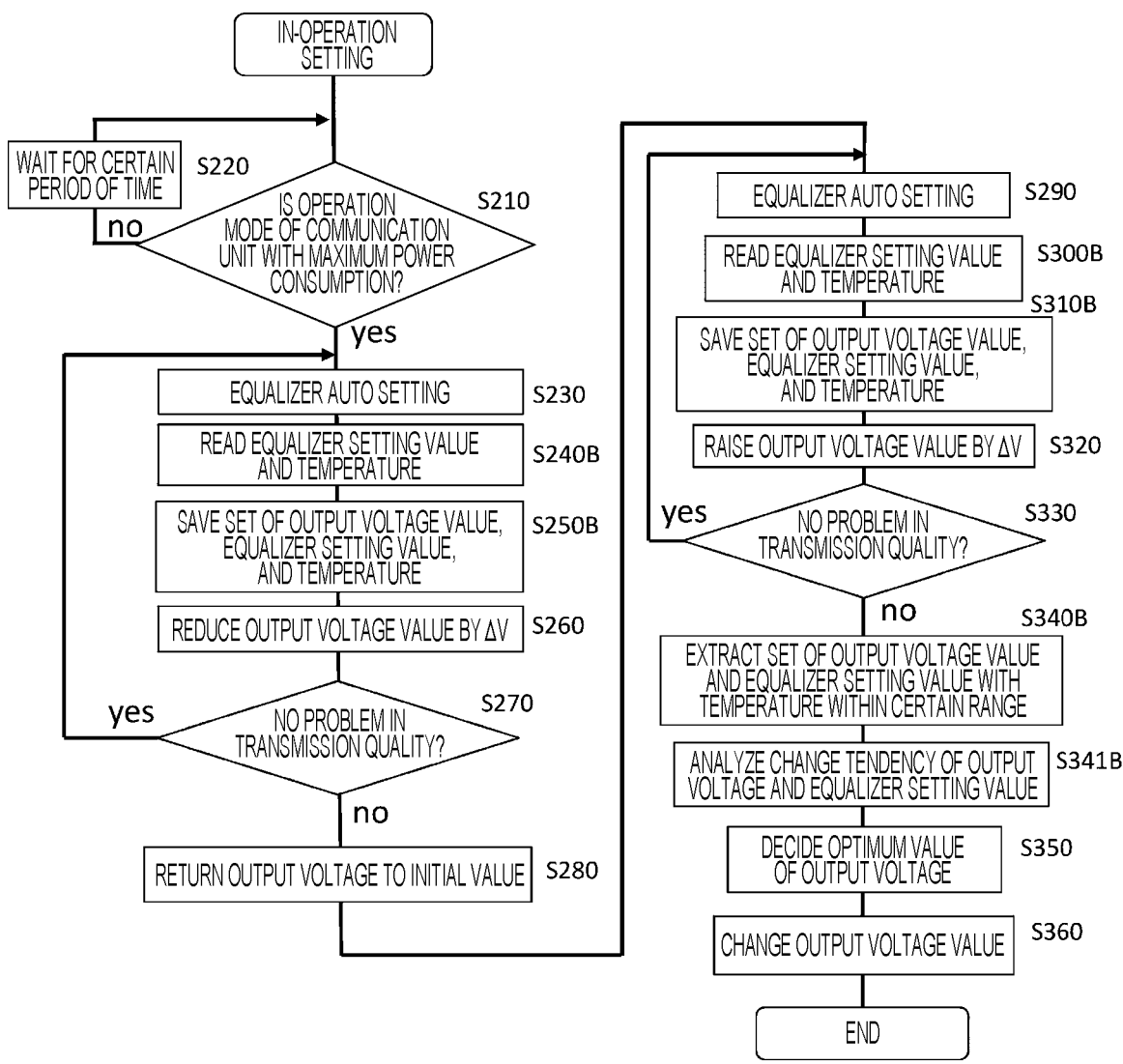
FIG. 11 is a flowchart illustrating a flow of in-operation setting processing according to the third embodiment of the present invention.

FIG. 11 is a flowchart illustrating a flow of in-operation setting processing according to the third embodiment of the present invention, which is carried out in order to reset the value of the output voltage Vd when the system is in operation.

In steps S210 to S230, the same processing as in FIG. 4 is performed respectively.

In steps S240B and S250B, the same processing as in steps S50B and S60B in FIG. 10 is performed respectively. That is, in step S240B, the equalizer setting value acquisition unit 301 reads the equalizer setting value from the deserializer 31B, and the temperature acquisition unit 308 acquires the temperature of the deserializer 31B. In step S250B, the equalizer setting value storage unit 303 stores the combination of the output voltage Vd, the equalizer setting value, and the temperature.

In steps S260 to S290, the same processing as in FIG. 4 is performed respectively. In steps S300B and S310B, the same processing as in steps S240B and S250B described above is performed respectively, and in steps S320 to S330, the same processing as in FIG. 4 is performed respectively.

In step S340B, the output voltage judgement unit 304 extracts a combination with the temperature being within a predetermined range from among the combinations of the output voltage Vd and the equalizer setting value that are stored and saved in the equalizer setting value storage unit 303 so far in steps S250B and S310B, similarly to step S90B of FIG. 10.

In step S341B, the output voltage judgement unit 304 analyzes the change tendency of the output voltage Vd and the equalizer setting value from the relationship between the output voltage Vd and the equalizer setting value extracted in step S340B, as in step S91B of FIG. 10.

In step S350, the output voltage judgement unit 304 decides the optimum output voltage Vd based on the change tendency analyzed in step S341B as in step S100 of FIG. 10. After the optimum output voltage Vd is decided, in step S360, as in FIG. 4, by outputting the output voltage control signal 306 indicating the voltage value from the output voltage control unit 305, the voltage of the direct current Id to be output in the future from the output voltage change unit 342 of the direct-current supply unit 34 is changed to the decided output voltage Vd.

When the processing of step S360 is executed or omitted, the flowchart of FIG. 11 is ended, the resetting of the output voltage Vd is completed, and the system operation is continued.

According to the third embodiment of the present invention described above, the control unit 3B includes the temperature acquisition unit 308 that acquires the temperature of the signal reception unit (deserializer 31B). The output voltage judgement unit 304 decides the output voltage Vd based on the relationship among the temperature that is acquired by the temperature acquisition unit 308 and the value of the output voltage Vd and the equalizer setting value that are stored in the equalizer setting value storage unit 303. With this configuration, it is possible to more accurately control the output voltage Vd to an optimum value by eliminating characteristic fluctuation due to the temperature dependency of the semiconductor occurring in the deserializer 31B in a case where the deserializer 31B is configured using an integrated circuit such as an LSI.

Note that, use of the third embodiment makes it possible to maintain the PoC filter performance in accordance with the actual load in the operation state, and hence it is not necessary to excessively design the reliability of the filter or to provide a current margin more than necessary. As a result, it is possible to use a low-cost filter component or to utilize a small-sized filter component requiring less rated current.

Fourth Embodiment

Next, a signal transmission system according to the fourth embodiment of the present invention will be described. In the present embodiment, an example in which the signal transmission system of the present invention is applied to a vehicle-mounted camera system will be described.

Figure 12:
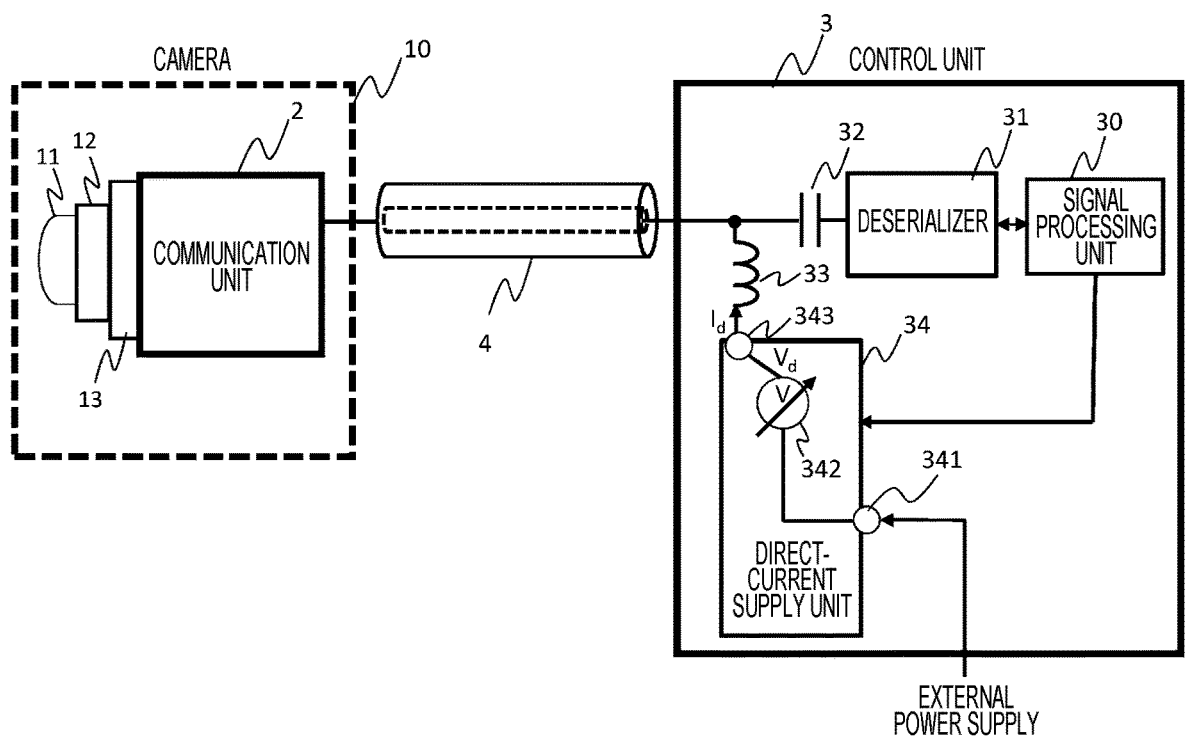
FIG. 12 is a view illustrating a camera system according to a fourth embodiment of the present invention.

FIG. 12 is a view illustrating a camera system according to the fourth embodiment of the present invention. A camera system 100 illustrated in FIG. 12 is configured such that a camera 10 and the control unit 3 are connected to each other via the signal wiring 4, and a signal is transmitted between the camera 10 and the control unit 3 via the signal wiring 4. The control unit 3 and the signal wiring 4 are the same as those in FIG. 1 described in the first embodiment. Note that in place of the control unit 3, the control unit 3A of FIG. 6 described in the second embodiment or the control unit 3B of FIG. 9 described in the third embodiment may be used.

The camera 10 includes the communication unit 2, a lens 11, a lens holder 12, and an image sensor 13. The lens 11 is fixed at a predetermined position with respect to the image sensor 13 by the lens holder 12. A subject image formed on the image sensor 13 by the lens 11 is captured by the image sensor 13 and converted into an image signal. The image signal output from the image sensor 13 is transmitted to the control unit 3 via the signal wiring 4 by the communication unit 2 The communication unit 2 has the same configuration as that described in the first embodiment, and operates upon receiving the direct-current power supply Id supplied from the direct-current supply unit 34 of the control unit 3 via the signal wiring 4. Note that the power supply generated by the power supply unit 24 (see FIG. 1) of the communication unit 2 from the direct current Id is supplied also to the image sensor 13 and used for the operation of the image sensor 13.

When the control unit 3 receives the image signal transmitted from the communication unit 2, the signal processing unit 30 performs predetermined arithmetic processing based on the image signal such as image processing for autonomous drive. This achieves various services using the camera 10 in the vehicle equipped with the camera system 100.

According to the fourth embodiment of the present invention described above, the communication unit 2 transmits an image signal of the camera 10 installed in the vehicle to the control unit 3 functioning as a signal transmission circuit. The signal processing unit 30 performs arithmetic processing based on this image signal. With this configuration, it is possible to achieve various services using the camera 10.

Fifth Embodiment

Next, a signal transmission system according to the fifth embodiment of the present invention will be described. In the present embodiment, an example in which a twisted pair cable, instead of a coaxial cable, is used for signal wiring will be described.

Figure 13:
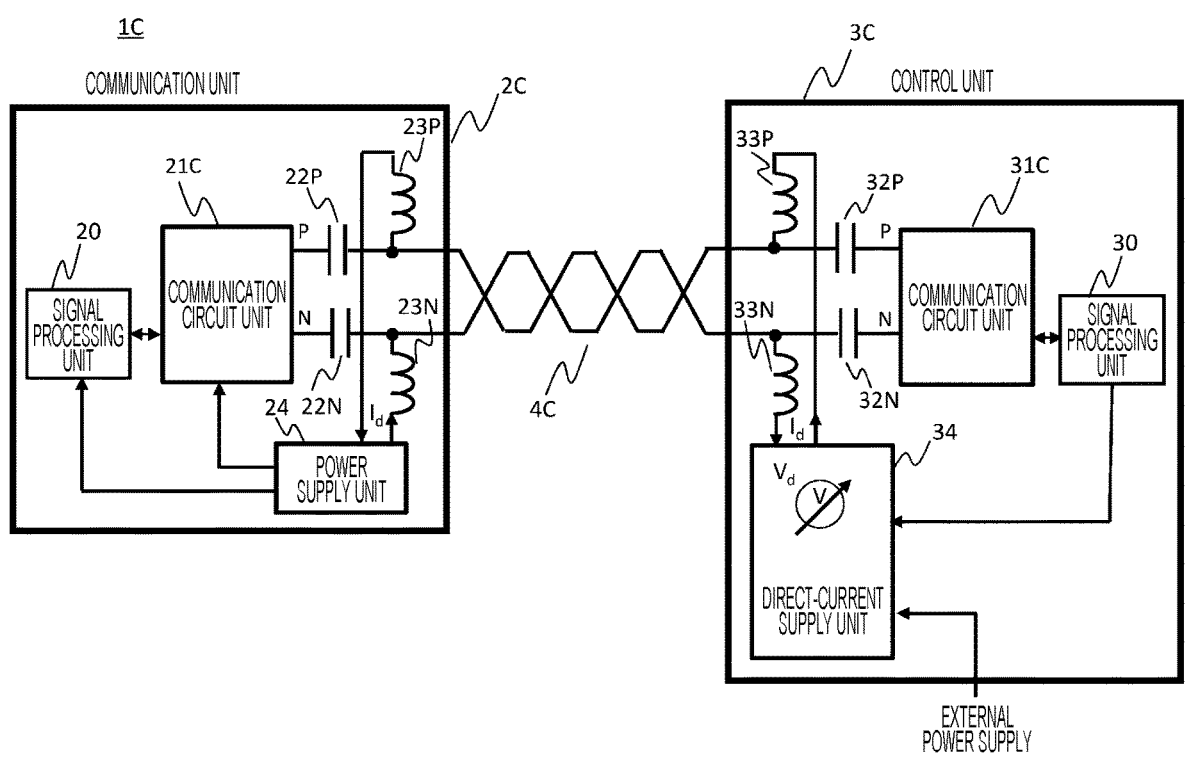
FIG. 13 is a view illustrating a signal transmission system according to a fifth embodiment of the present invention.

FIG. 13 is a view illustrating a signal transmission system according to the fifth embodiment of the present invention. Similarly to the first embodiment, a signal transmission system 1C illustrated in FIG. 13 is configured so that a communication unit 2C and a control unit 3C are connected to each other via a signal wiring 4C, and a signal is transmitted between the communication unit 2C and the control unit 3C via the signal wiring 4C. In the present embodiment, the signal wiring 4C is configured using, for example, a twisted pair cable. The following description assumes that signal transmission is performed from the communication unit 2C to the control unit 3C, but on the contrary, signal transmission may be performed from the control unit 3C to the communication unit 2C, or bidirectional communication may be performed.

The communication unit 2C has a function similar to that of the communication unit 2 of FIG. 1 described in the first embodiment, converts a parallel signal output from the signal processing unit 20 into a serial signal by a communication circuit unit 21C, and transmits the serial signal to the control unit 3C by differential transmission via the signal wiring 4C. Capacitors 22P and 22N each functioning as a high-pass filter that transmits a signal output from the communication circuit unit 21C and blocks the direct current Id supplied from the control unit 3C via the signal wiring 4C are connected between the communication circuit unit 21C and the signal wiring 4C. Inductors 23P and 23N each functioning as a low-pass filter (PoC filter) that transmits the direct current Id supplied from the control unit 3C via the signal wiring 4C, and blocks the signal output from the communication circuit unit 21C are connected between the power supply unit 24 and the signal wiring 4C.

The control unit 3C has a function similar to that of the control unit 3 of FIG. 1 described in the first embodiment, receives, by a communication circuit unit 31C, a signal transmitted from the communication unit 2C, and performs, in the signal processing unit 30, various arithmetic processing based on the signal, for example, processing related to autonomous drive of the vehicle based on the image signal. The direct-current supply unit 34 generates the direct current Id with the variable output voltage Vd, and supplies the direct current Id to the communication unit 2C via the signal wiring 4C. Note that the coexistence of the signal transmission and the power supply using the signal wiring 4C of the twisted pair cable is called power over data lines (PoDL).

Capacitors 32P and 32N each functioning as a high-pass filter that transmits a signal transmitted from the communication unit 2C via the signal wiring 4C and blocks the direct current Id output from the direct-current supply unit 34 are connected between the communication circuit unit 31C and the signal wiring 4C. Inductors 33P and 33N each functioning as a low-pass filter (PoC filter) that transmits the direct current Id output from the direct-current supply unit 34 and blocks the signal transmitted from the communication unit 2C via the signal wiring 4C are connected between the signal wiring 4C and the direct-current supply unit 34.

According to the fifth embodiment of the present invention described above, even in a case where the PoDL method is adopted, the output voltage Vd of the direct current Id is controlled based on the equalizer setting value, and it is possible to prevent deterioration in the transmission quality between devices having different PoC filter characteristics.

Note that the above-described embodiments and various modifications are merely examples, and the present invention is not limited to these contents unless the features of the invention are impaired. Although various embodiments and modifications have been described above, the present invention is not limited to these contents. Other aspects conceivable within the scope of the technical idea of the present invention are also included in the scope of the present invention.

The disclosure of the following priority application is incorporated herein by reference.

Japanese Patent Application 2019-30973 (filed on Feb. 22, 2019)

REFERENCE SIGNS LIST 1, 1C signal transmission system
2, 2C communication unit
3, 3A, 3B, 3C control unit
4, 4C signal wiring
11 lens
12 lens holder
13 image sensor
20 signal processing unit
21 serializer
22 capacitor
23 inductor
24 power supply unit
30, 30A, 30B signal processing unit
31, 31B deserializer
32 capacitor
33 inductor
34 direct-current supply unit
100 camera system
301 equalizer setting value acquisition unit
302 output voltage acquisition unit
303 equalizer setting value storage unit
304 output voltage judgement unit
305 output voltage control unit
307 power consumption acquisition unit
308 temperature acquisition unit
311 equalizer setting unit
312 equalizer setting value output unit
314 temperature sensor
341 input terminal
342 output voltage change unit
343 output terminal

The invention claimed is:

1. A signal transmission circuit that is connected to a communication unit by a signal wiring and performs signal transmission to/from the communication unit via the signal wiring, the signal transmission circuit comprising:
a direct-current supply unit that outputs a direct current with a variable output voltage, superimposes the direct current on the signal, and supplies the direct current to the communication unit via the signal wiring;
a signal reception unit that receives the signal from the communication unit; and
a signal processing unit that performs signal processing based on the signal received by the signal reception unit,
wherein the signal reception unit has an equalizer function that adjusts a waveform of the signal to compensate for attenuation due to the signal wiring, and
the output voltage is controlled based on an equalizer setting value used for control of the equalizer function.

2. The signal transmission circuit according to claim 1, further comprising:

a first filter unit that is connected between the signal wiring and the signal reception unit, transmits the signal, and blocks the direct current; and
a second filter unit that is connected between the signal wiring and the direct-current supply unit, transmits the direct current, and blocks the signal.

3. The signal transmission circuit according to claim 1 comprising:
an equalizer setting value storage unit that stores a relationship between a value of the output voltage and the equalizer setting value when the output voltage is changed;
an output voltage judgement unit that decides the output voltage based on a relationship between a value of the output voltage and the equalizer setting value stored in the equalizer setting value storage unit; and
an output voltage control unit that controls the output voltage based on the output voltage decided by the output voltage judgement unit.

4. The signal transmission circuit according to claim 3, further comprising:
a power consumption acquisition unit that acquires power consumption of the direct-current supply unit,
wherein the output voltage judgement unit decides the output voltage based on a relationship among the power consumption that is acquired by the power consumption acquisition unit and a value of the output voltage and the equalizer setting value that are stored in the equalizer setting value storage unit.

5. The signal transmission circuit according to claim 3, comprising:
a temperature acquisition unit that acquires temperature of the signal reception unit, wherein the output voltage judgement unit decides the output voltage based on a relationship among the temperature that is acquired by the temperature acquisition unit and a value of the output voltage and the equalizer setting value that are stored in the equalizer setting value storage unit.

6. The signal transmission circuit according to claim 1, wherein
the communication unit transmits an image signal of a camera installed in a vehicle to the signal transmission circuit,
the signal wiring is a coaxial cable or a twisted pair cable, and
the signal processing unit performs arithmetic processing based on the image signal.

7. A signal transmission system, comprising:
a communication unit that transmits a signal; and
a control unit that is connected to the communication unit by a signal wiring and receives the signal transmitted from the communication unit via the signal wiring,
wherein
the control unit includes
a direct-current supply unit that outputs a direct current with a variable output voltage, superimposes the direct current on the signal, and supplies the direct current to the communication unit via the signal wiring,
a signal reception unit that receives the signal from the communication unit, and
a signal processing unit that performs signal processing based on the signal received by the signal reception unit,
the signal reception unit has an equalizer function that adjusts a waveform of the signal to compensate for attenuation due to the signal wiring, and the output voltage is controlled based on an equalizer setting value used for control of the equalizer function.

8. The signal transmission system according to claim 7, wherein the control unit includes
- a first filter unit that is connected between the signal wiring and the signal reception unit, transmits the signal, and blocks the direct current, and
- a second filter unit that is connected between the signal wiring and the direct-current supply unit, transmits the direct current, and blocks the signal, and the communication unit includes
- a signal transmission unit that outputs the signal to the signal wiring,
- a power supply unit that supplies power to the signal transmission unit by using the direct current supplied from the direct-current supply unit,
- a third filter unit that is connected between the signal wiring and the signal transmission unit, transmits the signal, and blocks the direct current, and
- a fourth filter unit that is connected between the signal wiring and the power supply unit, transmits the direct current, and blocks the signal.

* * * * *